July 5, 1932.  W. A. WHITE ET AL  1,866,437
MOUNTING FOR WATER METERS
Filed April 17, 1929  3 Sheets-Sheet 1
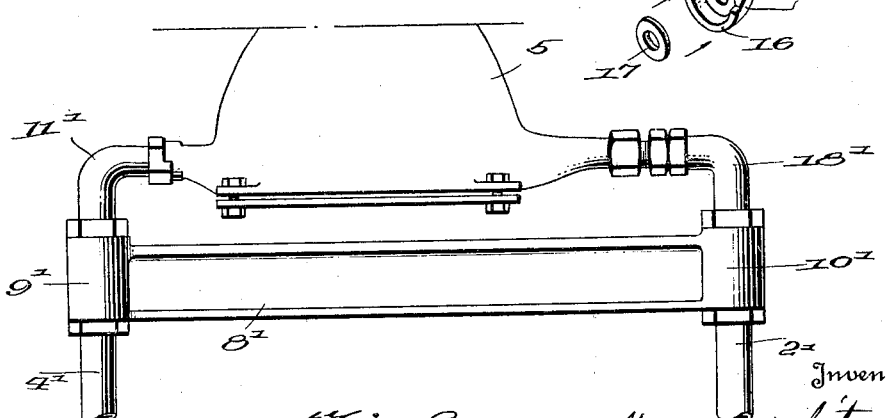

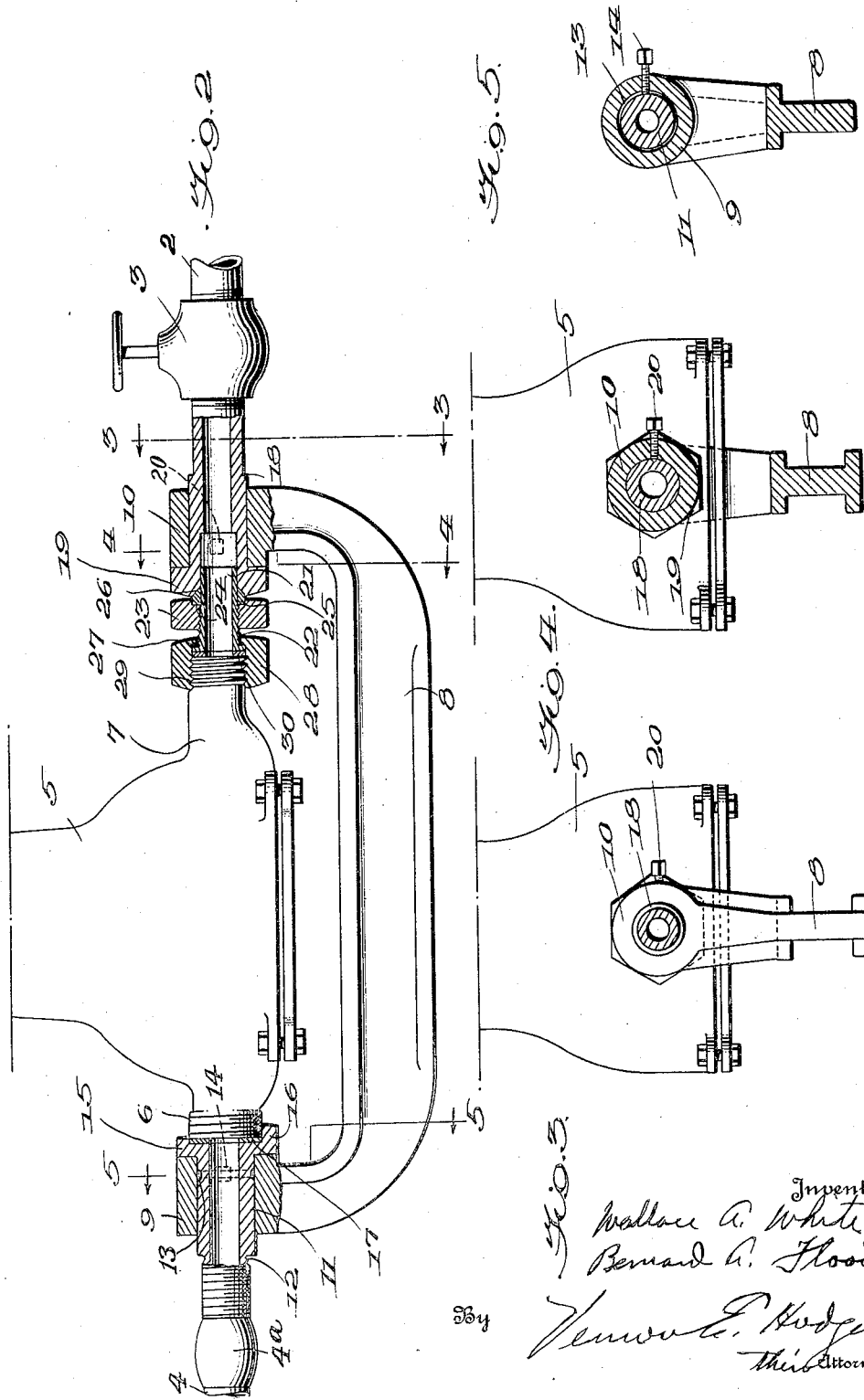

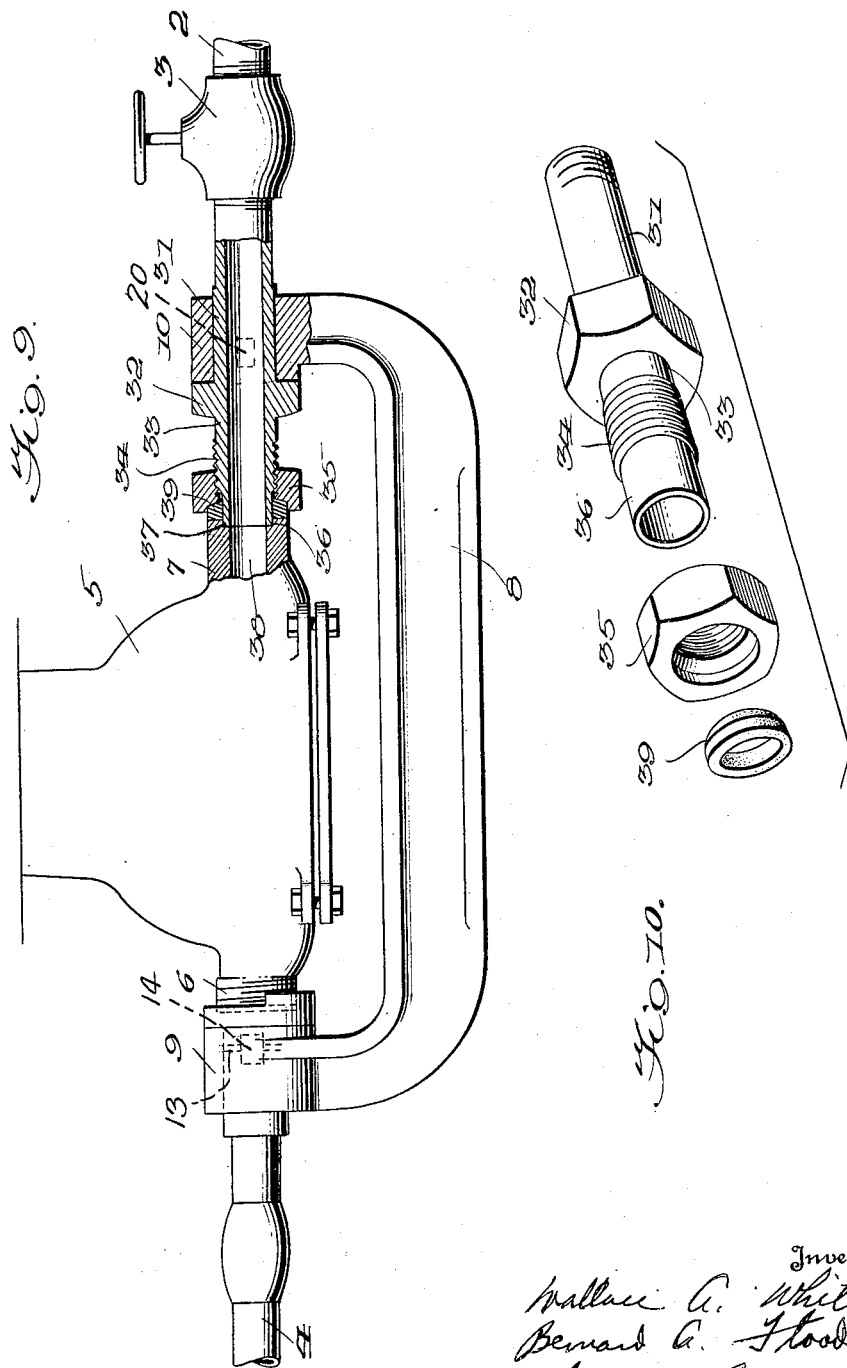

Patented July 5, 1932

1,866,437

UNITED STATES PATENT OFFICE

WALLACE A. WHITE AND BERNARD A. FLOOD, OF RICHMOND, VIRGINIA

MOUNTING FOR WATER-METERS

Application filed April 17, 1929. Serial No. 355,920.

This invention relates to an improvement in mountings for water meters.

The object of the invention is to simplify and improve the methods of mounting water meters so as to allow the meter to be assembled or removed from the mounting after the pipes have been installed and in use, without interfering with the location of the pipes and without causing any damage thereto. At the same time, the mounting provides a tight and secure connection between the water meter and the pipes.

In the accompanying drawings:

Fig. 1 is a sectional view through a meter-box casing, showing the invention applied thereto;

Fig. 2 is a side elevation partly in section through the mounting;

Fig. 3 is a sectional view on the line 3—3 of Fig. 2;

Fig. 4 is a similar view on the line 4—4 of Fig. 2;

Fig. 5 is a similar view on the line 5—5 of Fig. 2;

Fig. 6 is a disassembled perspective view of one of the meter attachments;

Fig. 7 is a similar view of the other meter attachment;

Fig. 8 is a side elevation of a modified form of yoke.

Fig. 9 is a side elevation, partly in section, showing a modified form of meter coupling; and Fig. 10 is a disassembled perspective view of the same.

Water meters are usually placed in casings disposed in the ground, and for this purpose the invention is illustrated in connection with such casing, designated generally by the numeral 1, although it is obvious that it might likewise be used in the cellar of a building or any other locations where it might be desirable to locate a water meter.

The inlet water pipe is designated by the numeral 2, having a cut-off valve 3 connected therewith. The outlet water pipe 4 leads from the opposite side of the casing 1 from the inlet pipe 2, and the water meter 5 is disposed between the valve 3 and the outlet pipe 4.

The present invention is designed to support the water meter 5 between the ends of the pipes and securely fasten the nipples 6 and 7 of the water meter to those pipes, and to provide tight joints therebetween.

For this purpose, a yoke 8 is provided, as shown in Fig. 2, said yoke having integral collars 9 and 10 on the opposite ends thereof and adapted to be disposed on opposite sides of the water meter 5. Journaled in the collar 9 is a tubular member 11, having a threaded end 12 adapted to be screwed into one side of a coupling 4ª.

This tubular member 11 may be turned in the collar 9 being journaled therein but is provided with an external groove 13, receiving a set screw 14, as shown in Fig. 5, to normally prevent longitudinal movement of the tubular member in the collar 9 and to prevent its removal therefrom. The tubular member 11 is provided with an external flange 15 having an upwardly opening and forwardly projecting flange 16, in which is seated a washer 17 for receiving the nipple 6 of the meter and providing a tight joint between the member 11 and the meter. The exterior of the tubular member of the flange 15 may be squared, as shown in Figs. 1 and 7, to receive a suitable wrench for turning this tubular member and screwing it into the end of the coupling 4ª.

Journaled in the opposite collar 10 is a tubular member 18 having the end thereof projecting through the collar and screwed into one side of the cut off valve 3 connected with the inlet pipe 2. This sleeve is provided with a head 19 squared or hexagonal or the like to receive a suitable wrench to turn the same whenever desired, and it may be locked in position in the collar 10 by a set-screw 20, as shown in Fig. 4.

A tube 21 is adapted to be inserted at least part-way into the tubular member 18, as shown in Fig. 2. This tube 21 is threaded as at 22 to receive a nut 23. This nut 23 is recessed as at 24 and disposed in this recess is a packing washer 25 adapted to abut against a conical or spherical seat 26 formed in the head 19.

The end of the tube 21 has a flange 27 against the back of which a coupling nut 28 abuts loosely, said nut being adapted to be screwed onto the threaded part 29 of the nipple 7. A packing washer 30 is interposed between the end of the nipple 7 and end of the tube 21.

In assembling the device, the valve 3 is cut off; and the tubular member 11 is coupled with the pipe 4 through the collar 9, while the tubular member 18 is screwed into the valve 3 connected with the inlet pipe 2. It is then only necessary that the water meter 5 be seated between the ends of the yoke 8 with the nipple 6 seated on the flange 16, and the nut 28 is screwed onto the threaded portion 29 of the nipple 7. By turning the nut 23 on the threaded portion 22, the tube 21 is fed toward the meter 5 being slidable within the end of the tubular member 18, which forces the meter toward the collar 9 and the nipple 6 against the packing washer 17 to form a tight joint therewith.

This provides a simple and effective means of supporting the water meter, simplifying the manner of assembling or removing it. Since the casings 1 are usually of relatively small size, it is often difficult to turn the pipes to secure the proper connections, and this is unnecessary by the use of the present mounting for the water meter, because all that needs to be turned are the several nuts which secure the mounting to the pipes and effectively backs up the water meter to securely support it in its proper position.

In the modified form shown in Fig. 8, the yoke 8' is provided with the collars 9' and 10' in the opposite ends but extending parallel to each other and not in alignment, as in Figs. 1 and 2, so as to receive upwardly extending parallel water pipes 4' and 2'. In this form, the tubular members 11' and 18' have angular portions to project through the collars 9' and 10'. The assembly and other construction in this form are the same as above described.

In the modification shown in Figs. 9 and 10, a tubular member 31 is connected with the valve 3 and has an enlargement 32 formed thereon in the shape of a nut to abut against the collar 10 and may be used for turning the tubular member 31. The tubular member 31 is provided with an extended portion 33, which is externally threaded as at 34 for receiving a nut 35, and this extended portion 33 terminates in a reduced portion 36, which is adapted to fit into an enlargement 37 of the orifice 38 extending through the water meter nipple 7. As shown in Fig. 9, the opening through the tubular member 31 and extensions thereof is approximately coextensive in size with the orifice 38, so as not to interfere with the flow of water therethrough. A packing 39 is interposed between the end of the nipple 7 and the nut 35 so as to provide a tight connection of the tubular member 31 with this nipple.

This arrangement eliminates one of the packing washers and therefore eliminates another possibility of a leak. At the same time the extension 36, which fits into the enlargement 37 and the orifice of the water meter, prevents reversing the meter or otherwise interfering with its proper operation.

However, if desired, this extension may not be extended entirely into the end of the nipple 7 but may terminate at the outer end thereof, thus making it unnecessary to form the enlarged portion 37.

We claim:

1. In a mounting for water-meters, the combination of inlet and outlet pipes, a valve connected with the inlet pipe, a yoke connecting the inner ends of the pipes together, a water-meter disposed between said inner ends, and connected with the outlet pipe, and a tubular member journaled in the yoke, and connecting one side of the water-meter with the valve of the inlet-pipe.

2. In a mounting for water meters, the combination with inlet and outlet pipes, and a water meter disposed therebetween, of a yoke having integral collars at the opposite ends thereof, and tubular members journaled in said collars and connecting the opposite sides of the water meter with the inlet and outlet pipes.

3. In a mounting for water meters, the combination with inlet and outlet pipes, and a water meter disposed therebetween, of a yoke having integral collars at the opposite ends thereof, tubular members journaled in said collars for connecting the inlet and outlet pipes with the water meter, a tube connected with at least one of said tubular members, and a coupling nut connecting said tube with the water-meter.

4. A fitting for water meters comprising a yoke having integral fixed collars at the opposite ends thereof, a tubular member journaled in each of said collars and adapted to be connected with water supply pipes at their outer ends, a water meter disposed between said tubular members and having a frictional connection with at least one thereof, an extension connected with the other tubular member and externally threaded, and a nut threaded into the extension for causing a frictional connection between said extension and the other side of the water meter.

5. In a water supply system, the combination with inlet and outlet water supply pipes, of a yoke having longitudinally aligned integral collars arranged at the opposite ends thereof, and tubular members journaled in said collars and connected with the pipes, said tubular members being adapted to receive and support a water meter therebetween.

6. In a water supply system, the combination with inlet and outlet water supply pipes, of a yoke having integral collars arranged at the opposite ends thereof, tubular members journaled in said collars and connected with the pipes, said tubular members being adapted to receive and support a water meter therebetween, and an adjustable extension connected with at least one of said tubular members to hold the water meter securely in place.

7. The combination with a water-meter having a nipple, said nipple having an enlarged orifice in the end thereof, of a tubular member having an externally threaded portion and a reduced end portion extending into said enlarged orifice, a yoke having a journal arranged to support the tubular member a nut screwed onto the threaded portion to apply pressure against the end of the nipple to hold the meter in place, said nut having a recess in the side thereof toward the nipple, and a packing-ring seated in said recess and arranged between the nut and the end of the nipple.

8. The combination with a water-meter having a nipple, said nipple having an enlarged orifice in an end thereof, of a tubular member having a reduced end portion extending into said enlarged orifice, a yoke having a journal arranged to support the tubular member and means forming a tight connection between the tubular member and the nipple.

9. A fitting for water-meters comprising a tubular member having a seat in an end thereof, a tube projecting into said tubular member through the seat and being externally threaded, a nut screwed onto the tube and having a recess in a side thereof, a washer seated in said recess and adapted to engage the seat, and a coupling-nut having a loose connection with the tube for securing the tube to a water-meter nipple.

10. A fitting for water-meters comprising a tubular member, a journal into which said tubular member extends and is rotatably mounted, a tube aligned with said tubular member, means forming a tight connection between the tube and tubular member, and a nut having a loose connection with the tube for connecting the same with a water-meter nipple.

11. In a mounting for water-meters, the combination with horizontally aligned inlet and outlet pipes, and a valve casing connected with the inlet pipe, of a yoke connecting the inner ends of the pipes together and adapted to have a water-meter disposed therebetween to be connected with the outlet pipe, and a tubular member journaled in the yoke and connected with the valve casing to connect the water-meter therewith.

12. In a mounting for water-meters, the combination with horizontally aligned inlet and outlet pipes adapted to be connected with a water-meter therebetween, of a yoke having integral collars at the opposite ends thereof, and tubular members journaled in the collars and adapted to connect the opposite sides of the water-meter with the inlet and outlet pipes.

13. In a mounting for water-meters, a yoke having integral collars at the opposite ends thereof, and tubular members journaled in the collars and adapted to connect opposite sides of a water-meter with inlet and outlet pipes.

14. In a mounting for water-meters, a yoke having integral collars at the opposite ends thereof, tubular members journaled in said collars and adapted to be connected with inlet and outlet pipes, a tube forming a continuation of one of said tubular members, and a coupling nut for connecting said tube with a water-meter.

In testimony whereof we affix our signatures.

WALLACE A. WHITE.
BERNARD A. FLOOD.